Jan. 12, 1960 P. L. MARSHALL ET AL 2,920,844
AIRCRAFT BOUNDARY-LAYER CONTROL SYSTEM
Filed April 12, 1957 6 Sheets-Sheet 1

INVENTORS
PETER L. MARSHALL
JACK R. MACAULAY
WILLIAM SOLOMON
RUSSELL J. STEFFY
ROGER A. PETREY
BY
ATTORNEY

Fig. 9

INVENTORS
PETER L. MARSHALL
JACK R. MACAULAY
WILLIAM SOLOMON
RUSSELL J. STEFFY
ROGER A. PETREY
ATTORNEY

United States Patent Office 2,920,844
Patented Jan. 12, 1960

2,920,844

AIRCRAFT BOUNDARY-LAYER CONTROL SYSTEM

Peter L. Marshall, Jack R. Macaulay, William Solomon, and Russell J. Steffy, Columbus, Ohio, and Roger A. Petrey, Rolling Hills, Calif., assignors to North American Aviation, Inc.

Application April 12, 1957, Serial No. 652,618

6 Claims. (Cl. 244—42)

This invention relates broadly to aircraft and is particularly concerned with a boundary-layer control system which may be incorporated in an aircraft and utilized to increase the lifting effectiveness of that aircraft's flight control surfaces. The aircraft boundary-layer control system of this invention may particularly be selectively operated during flight take-off and landing operations and when so utilized functions to reduce those airspeeds minimumly required by the aircraft to sustain flight.

It is to be noted that the boundary-layer control system of this invention may be advantageously installed in aircraft having performance capabilities throughout a range of near-sonic and supersonic velocities and when properly installed and utilized the system functions to provide such aircraft with both improved cruising performance capabilities and with take-off and landing capabilities comparable to those take-off and landing capabilities typically associated with aircraft of a lower performance type. If selectively operated during take-off and landing operations the boundary-layer control system of this invention serves to make certain high-speed aircraft incorporating the system more operational with respect to those take-off and landing facilities and/or equipment which have been heretofore generally provided for aircraft and which would otherwise be inadequate for use by said aircraft.

In addition to making essentially high-speed performance aircraft more operational with respect to existing runways, landing strips, catapult launchers, carrier decks, arresting gear, and the like, the boundary layer control system of this invention may be utilized to lower minimumly required take-off and landing airspeeds to an extent whereby the safety hazards associated with high-speed aircraft take-off and landing operations are substantially reduced.

The boundary-layer control system of this invention utilizes supercirculation or blowing techniques to effect a reduction of aircraft minimum take-off and landing airspeed requirements and it is an object of this invention to provide an improved form of supercirculation type boundary-layer control system which is especially well-suited for installation in aircraft basically of the high-speed performance capability type.

Another object of this invention is to provide a form of boundary-layer control system which, using supercirculation techniques, will make its associated high-speed aircraft more operational with respect to take-off and landing facilities, such as runways, landing strips, launching or catapult equipment, naval aircraft carrier flight decks, motion arresting devices, and the like, typically provided for aircraft having lower-speed performance capabilities.

Another object of this invention is to provide a form of boundary-layer control system which may be selectively operated during aircraft flight to improve cruising performance characteristics of the incorporating aircraft.

Another object of this invention is to provide a boundary-layer control system which is properly located with respect to the major components and important control surfaces of the aircraft so as to be of maximum effectiveness.

Another object of this invention is to provide an aircraft boundary-layer control system which utilizes high-pressure, high-velocity air as an operating medium.

Another object of this invention is to provide an aircraft boundary-layer control system which will utilize high-energy air as supplied by the compressor components of turbo-jet engine power plants typically associated with high-speed performance aircraft or as supplied by auxiliary compressor units incorporated in the aircraft.

A still further object of this invention is to provide an improved form of supercirculation type boundary-layer control system which requires the circulation of reduced quantities of high-energy air for maximum effectiveness as compared to the circulation requirements of heretofore known supercirculation boundary-layer control systems.

Another object of this invention is to provide an aircraft boundary-layer control system having component parts of particular design and fabrication which minimize air energy losses within the system and consequently increase the overall efficiency thereof.

Another object of our invention is to provide a form of aircraft boundary-layer control system which may be properly installed within an aircraft structure without imposing undue strength penalties upon that structure. Additionally, we seek to provide a boundary-layer control system whose components may be located in relatively non-congested areas or zones within the aircraft structure.

Another object of this invention is to provide a form of supercirculation type boundary-layer control system which, when utilizing high-temperature air, will be so located with respect to aircraft wing member components as to minimize fire hazards relating to fuel carried in wing member component fuel cells.

A still further object of this invention is to provide a form of supercirculation type boundary-layer control system which utilizes readily available construction materials, which is fabricated by the use of well-known techniques, which is extremely reliable in operation, and which is relatively simple to service and/or maintain.

Other objects and advantages of this invention will become more apparent when taken in view of the accompanying description and drawings.

In the drawings, wherein like numerals are employed to designate like components throughout the same.

Figure 1:
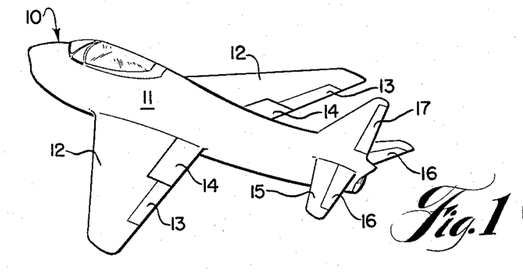
Fig. 1 is a perspective view of a typical high-speed aircraft showing various of its components.

In Fig. 1 a high-performance aircraft 10 is shown with certain of its principal components such as fuselage 11, wing members 12, which have aileron components 13 and flap components or landing flaps 14 incorporated therein, and horizontal stabilizer 15. Elevators 16 are incorporated in the horizontal stabilizer and a rudder 17 is provided in the vertical stabilizer portion of the aircraft empennage section.

Figure 2:
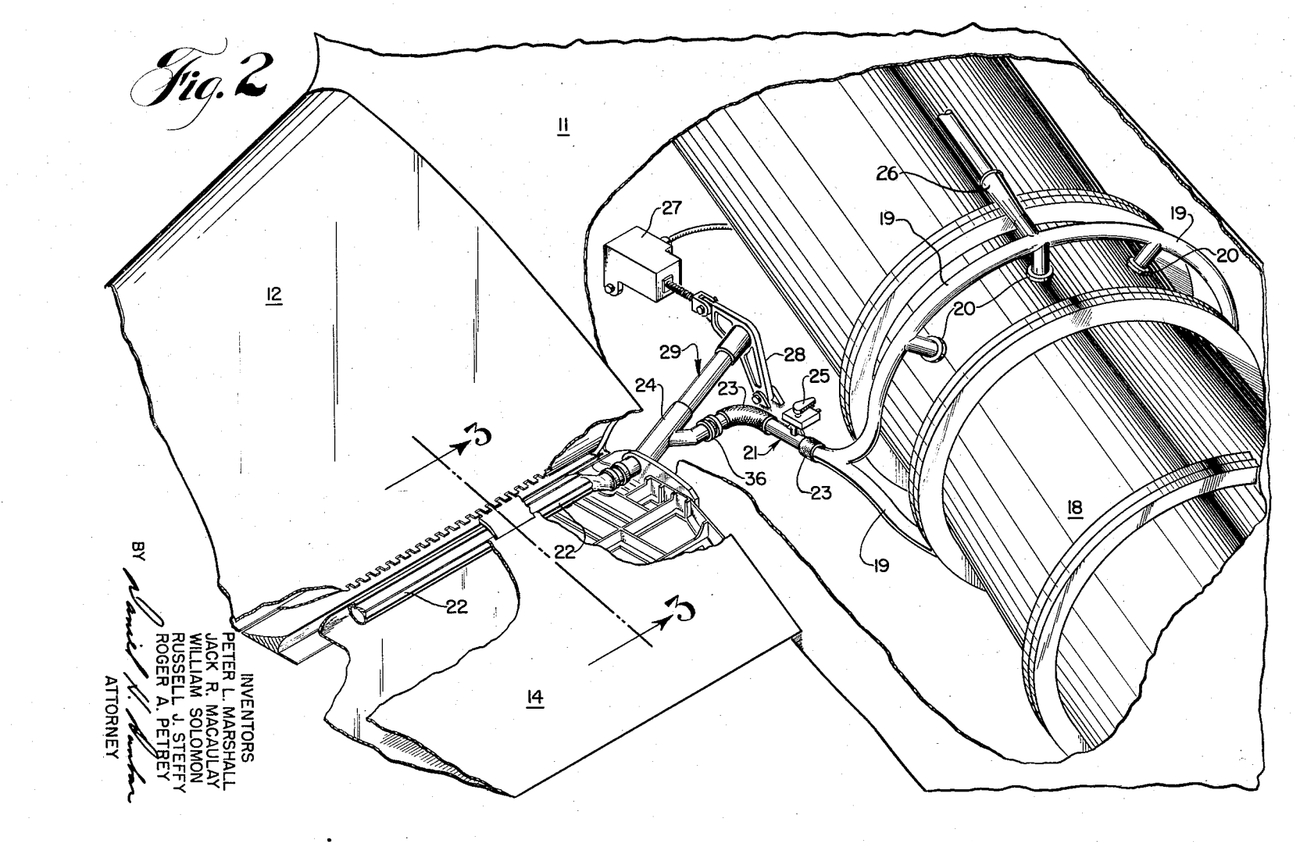
Fig. 2 is a perspective view of portions of a high-speed aircraft incorporating the boundary-layer control system of this invention. Components of the system are more clearly shown through use of a break-away technique.

Portions of the surface and structural components of fuselage 11 have been removed in Fig. 2 to more clearly show a compressor 18, which may be a component of an aircraft turbo-jet type of power plant or which may be an auxiliary unit; other components of the system of this invention are shown in association therewith. A bleed air extraction manifold 19 is operatively connected to the compressor through air extraction ports indicated generally at 20. A supply duct means shown generally at 21 serves to carry high-energy air from compressor manifold 19 to distribution duct 22 which is located in the leading edge portion of wing member flap component 14. Flexible couplings 23, a torque arm component 24, and shut-off valve 25 may be contained within, and in all essence constitute portions of, supply duct 21. The supply duct components are preferably fabricated of stainless steel or other temperature-resistant, corrosion-resistant, high-strength materials.

Other components illustrated in Fig. 2 which should be referred to at this point include a supply duct 26 leading to the aircraft's heating and ventilating system and an actuator 27 which cooperates with bellcrank 28 and torque arm 29, and which functions to extend flap component 14 relative to wing member 12 during take-off and landing operations. Other environmental structural components are detailed in Fig. 2, but because their specific function is believed to be obvious to those familiar with aircraft construction no extended reference is herein made to such structural details.

Also, it should be emphasized that the boundary-layer control system of this invention is generally a balanced and symmetrical system in that similar system components are provided in each wing member flap component of the aircraft. However, through the system is balanced or symmetrical in a physical sense, it is to be noted that opposed portions of the system can be alternately modulated during system operation to provide a form of roll control or lateral control as hereinafter more fully explained. Throughout the accompanying drawings, only an approximate half portion of the system is shown for convenience of illustration and description.

Figure 3:
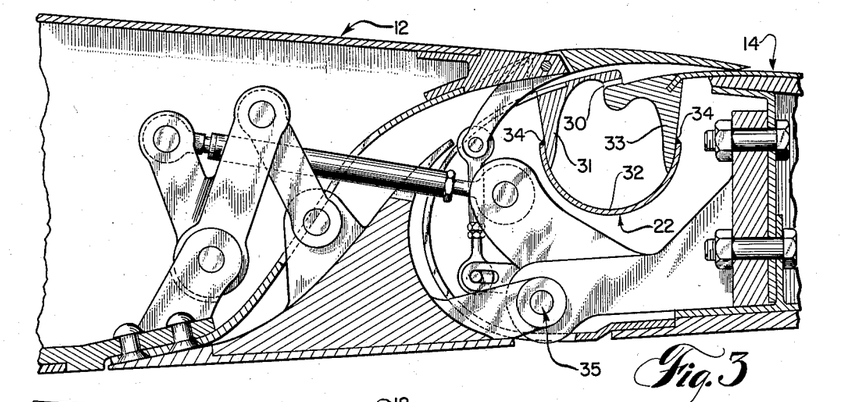
Fig. 3 is a partial sectional view taken along line 3—3 of Fig. 2.
Figure 4:
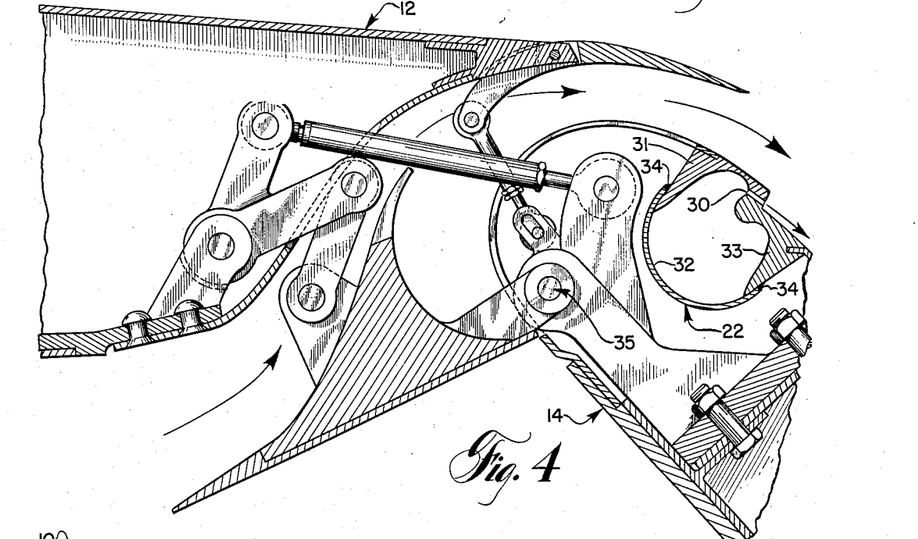
Fig. 4 is a partial sectional view similar to the view of Fig. 3, but with the wing member flap component shown in an extended position relative to the aircraft wing member.

Figs. 3 and 4 further illustrate the relationship between distribution duct 22 and the aircraft wing member 12 and its flap component 14 in detail. It is to be noted first that duct or plenum 22, which preferably extends the full length of the span of flap component 14, is located interior of the principal flap component surfaces. Also a discharge slot 30, which is preferably continuous, is provided in the distribution duct assembly 22 to properly direct the pressurized air which is preferably uniformly distributed therethrough and uniformly discharged therefrom.

Duct assembly 22 is formed essentially of components 31, 32, and 33, which like other components of this system, are preferably fabricated of a high-strength, high-temperature-resistant and corrosion-resistant material such as stainless steel or titanium alloy. As illustrated in the accompanying drawings, these assembly components may be joined by welding techniques in the regions 34. Other forms of construction and assembly are recognized and well-known to those skilled in the art.

Fig. 4 differs from Fig. 3 in that flap 14 is shown in its pivotally extended position with respect to wing member 12. This extended position of flap 14 is effected particularly during take-off and landing operations by the selective operation of actuator 27 which may be of either a hydraulic or electric type. Torque transmitted through torque arm 29 causes the landing flap to pivot about its hinge pin 35 which is fixed relative to wing member 12.

During a "flaps-down" aircraft maneuver, the boundary-layer control system of this invention can be made operative by the opening of shut-off valve 25 to thus cause high-energy bleed air extracted from compressor 18 to be ducted through manifold 19, supply duct 21, and distribution duct 22, and subsequently discharged through slot 30 tangentially over the flap component 14 upper surface. In this manner the lifting effectiveness of wing member 12 can be improved, especially during comparatively low speed take-off and landing operations when an appreciable reduction in the minimum airspeeds required to sustain flight is desired. Also, each valve 25 in the opposed supply ducts of the system may be alternately and sequentially operated between open and closed positions or between varying flow-permitting positions to provide a form of system modulation. Such operation can consequently cause a rocking tendency in the aircraft to provide a degree of roll control or lateral control as often required for take-off operations.

Figures 5, 6:
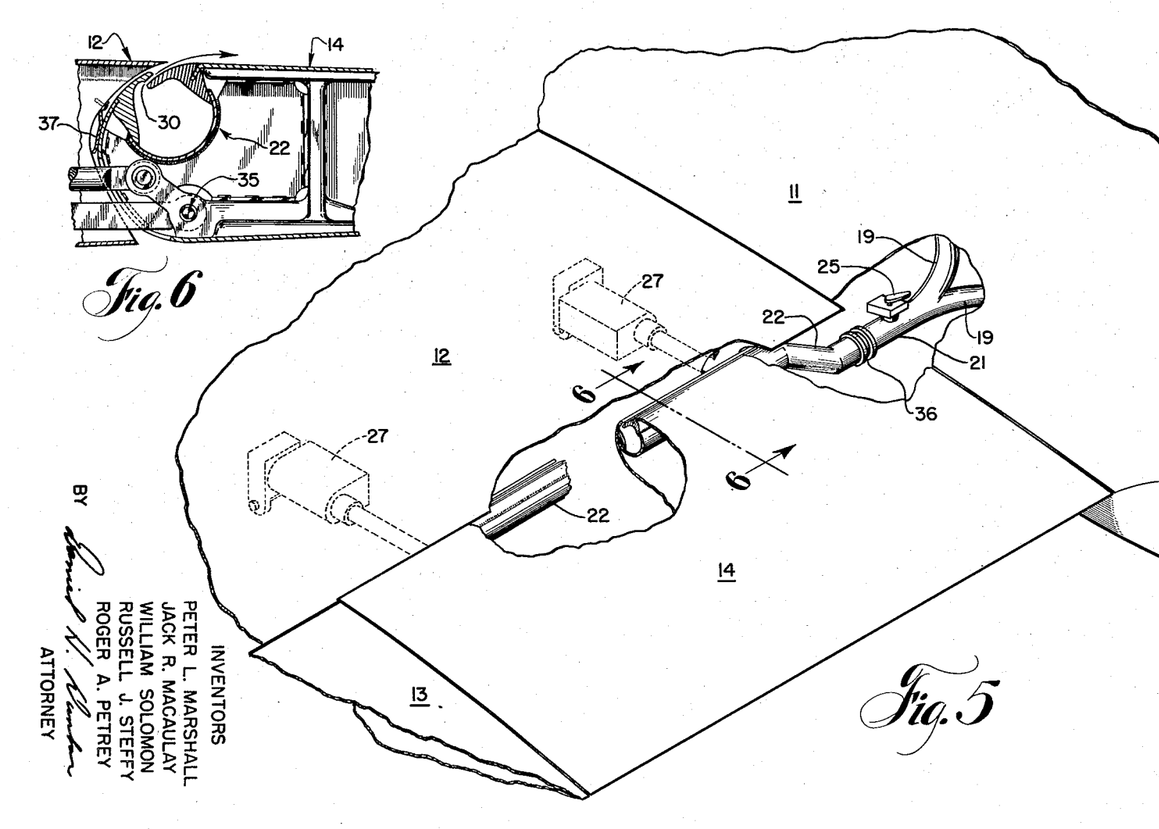
Fig. 5 is a perspective view of portions of a highspeed aircraft having a wing member construction different from that construction shown in Figs. 2 through 4, but having the boundary-layer control system of this invention incorporated therein.
Fig. 6 is a partial sectional view taken along line 6—6 of Fig. 5.

The boundary-layer control system of this invention is again illustrated in Figs. 5 and 6 wherein it has been incorporated in an aircraft having a wing member construction different from that of Figs. 2 through 4. The basic system components are common to both constructions, but the aircraft of Figs. 2 through 4 additionally incorporates the slot door and deflector arrangement shown therein in combination with a single slot arrangement of boundary-layer control. The boundary-layer control system of our invention is particularly effective when installed in aircraft having the construction arrangement of Figs. 5 and 6 wherein a single slot arrangement of flap boundary-layer control is not utilized.

In the arrangement of Figs. 5 and 6, flap component 14 pivots about axis 35 when it is to be extended and it is extended by actuators 27 which cooperate directly with structural components of flap 14 rather than function through an offset torque arm arrangement such as that shown in Fig. 2. Additionally, a pressure swivel joint 36 is provided intermediate supply duct 21 and distribution duct 22 and its axis should preferably be aligned with the axis of rotation of flap component 14. A similar type connection is shown at 36 in Fig. 2.

Save for the comments herein elsewhere noted, the boundary-layer control system of our invention as shown in Figs. 5 and 6 functions similarly to that shown in Figs. 2 through 4. When it is desired to operate the boundary-layer control system the valve 25 may be selectively actuated by the pilot of the aircraft to cause pressurized, high-temperature air to be bled from the compressor and directed through manifold 19, supply duct 21, and distribution duct 22; such air is subsequently exhausted through slot 30, tangential to and rearwardly over the upper surface of flap component 14, at velocities which preferably attain or exceed the velocity of sound.

A resilient spring component 37 or other functionally similar member may be secured to the aft portion of wing member portion 12, and compressed as shown in Fig. 6. This spring member, which is continuous throughout the length of flap component 14, functions to eliminate or close any air passageway which might exist between wing member portion 12 and flap component 14. When flap component 14 is extended the unsecured edge of spring 37 rides upon the leading edge surface portion of the flap component to thus effect an air seal between the wing member and flap component.

Figures 7, 8:
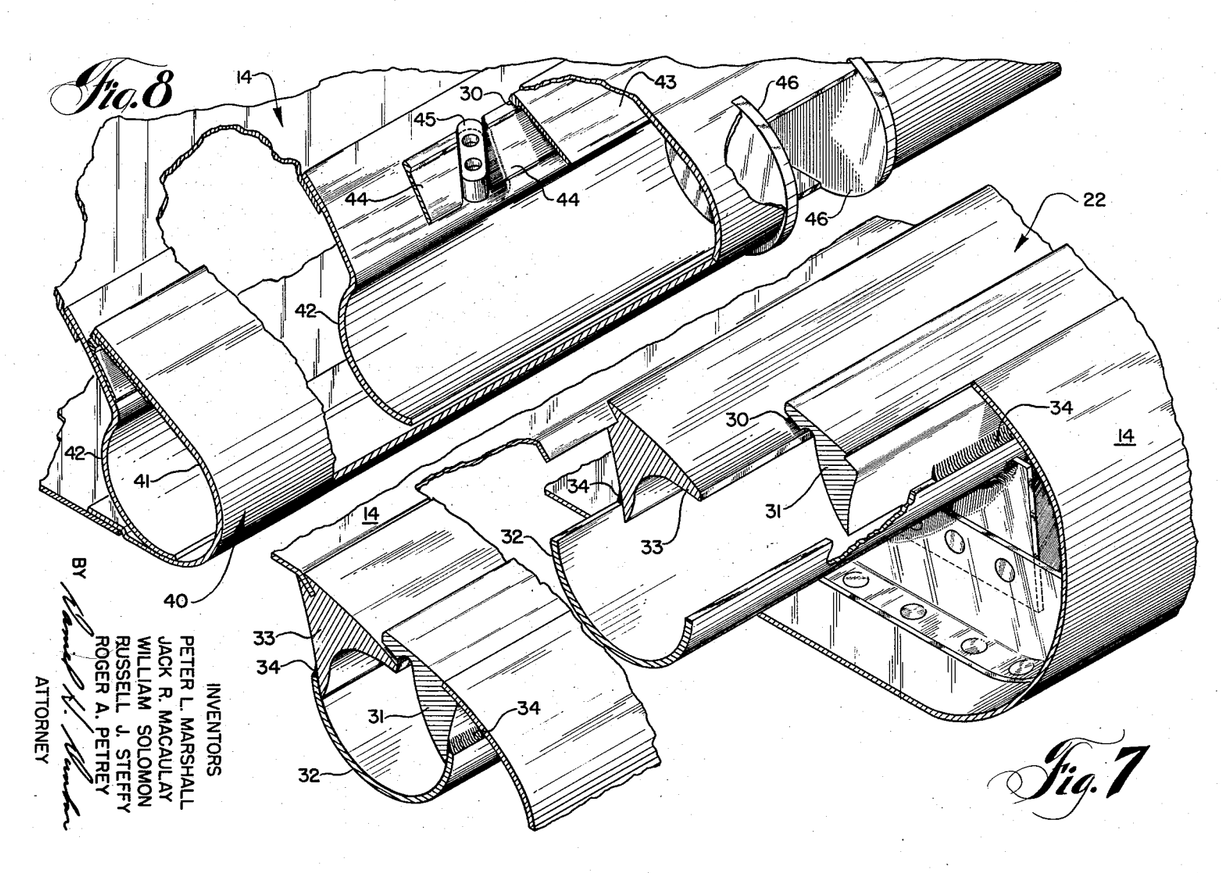
Fig. 7 is a fragmentary perspective view of a portion of the distribution duct component of the boundary-layer control system shown in Figs. 2 through 6 and portions of the wing member flap component leading edge associated therewith.
Fig. 8 is a fragmentary perspective view of a portion of an alternate form or embodiment of the distribution duct component for the boundary-layer control system of this invention.

A peel-down illustration technique is used an Fig. 7 to show construction details of distribution duct 22. It may be observed therein that the skin components of flap 14 are cooperatively engaged with components 31 and 33 of the distribution duct 22 and that the internal structural members of flap 14 may be conveniently notched to receive the duct member when necessary. Also, it should be pointed out that generally the leading edge portion of the flap component 14 is less congested with structural members and control mechanisms and linkages than is the trailing edge of wing member portion 12.

An alternate form of plenum or distribution duct component is designated as 40 and is illustrated in Fig. 8. In the form here shown, a component of the duct assembly additionally functions to provide a substantial portion of the flap component leading edge surface.

The component parts of distribution duct assembly 40 include forward skin 41, aft skin 42, upper nozzle plate 43, lower nozzle plate 44, and spacers 45. The upper and lower nozzle plates 43 and 44 may be welded to forward and aft skins 41 and 42, respectively. Spacers 45 are spaced intermediate the surfaces of the forward and aft skins in a spaced-apart relationship throughout the length thereof; they may be secured into the assembly by riveting or like means and when installed, function to provide the assembled distribution duct 40 component with greater rigidity. Slot 30, through which high-energy supercirculation air is discharged, is quite similar to the slot 30 illustrated elsewhere in the drawings. End plates 46 may be provided in the assembly to the extent required as hereinafter described.

The form of air distribution duct illustrated in Fig. 8 is so designed that certain of its outer surface portions comprise substantially the total portion of the flap leading edge outer surface. Further, this form of construction may be advantageously employed where use of a readily removable or replaceable air distribution duct is required. Should supercirculation gases cause excessive corrosion of the air distribution duct assembly 40, it may be removed following the removal of such fasteners (not shown) as may secure the duct assembly to the upper and lower skins of the flap proper. Installation of the replacement air distribution duct assembly is accomplished in an opposite manner.

Figure 9:
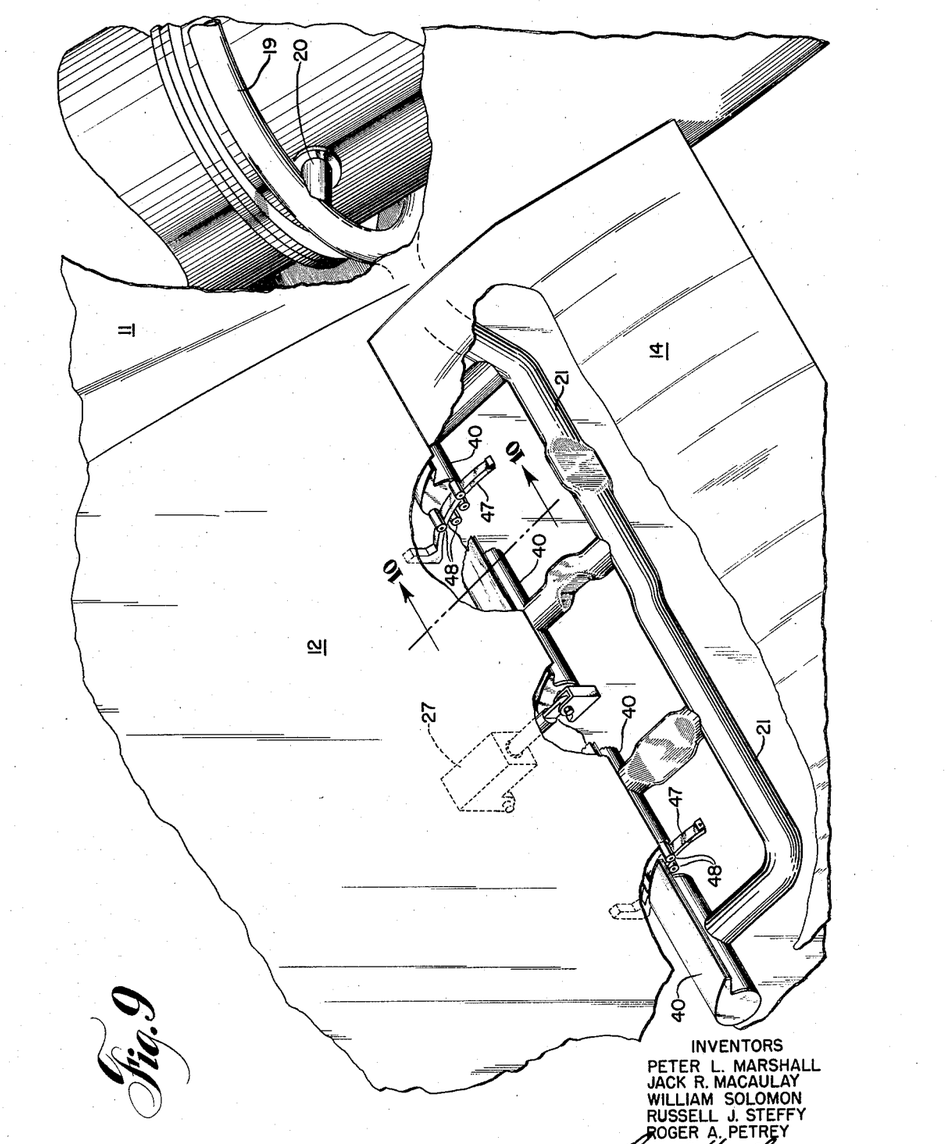
Fig. 9 is a perspective view of portions of a high-speed aircraft having a wing member construction different from those constructions shown in Figs. 2 through 7, but having the boundary-layer control system of this invention incorporated therein. The system as here illustrated is somewhat different than the system form illustrated in Figs. 2 through 7.
Figures 10, 11:
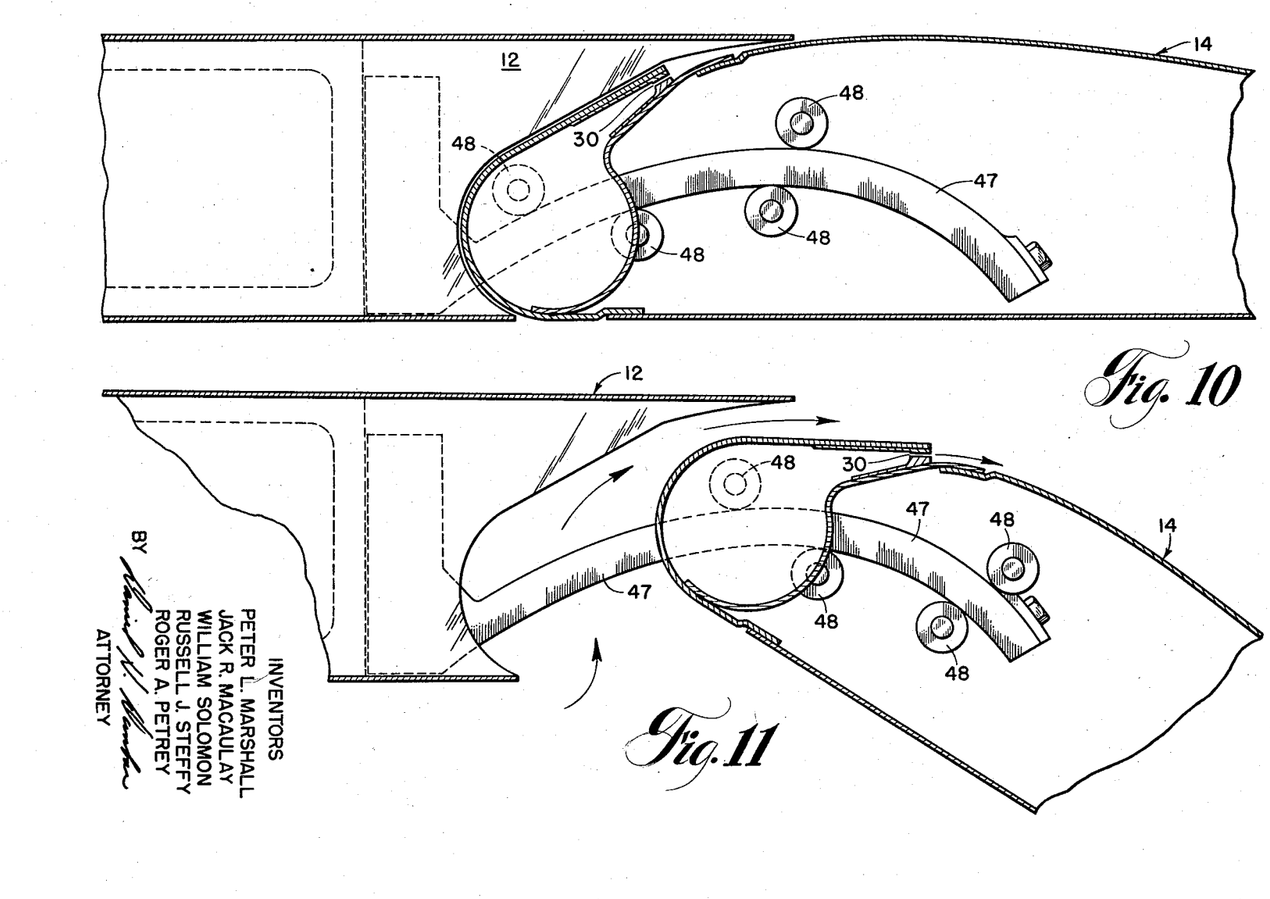
Fig. 10 is a partial sectional view taken along line 10—10 of Fig. 9.
Fig. 11 is a partial sectional view similar to the view of Fig. 10, but with the wing member flap component shown in an extended position relative to the aircraft wing member.

Figs. 9 through 11 illustrate the boundary-layer control system of our invention as incorporated in an aircraft having a mode of flap component actuation somewhat different than modes of flap actuation or operation utilized by the forms of aircraft illustrated in Figs. 2 through 4 or in Figs. 5 and 6. The flap component 14 of Figs. 9 through 11 travels with a combined translatory and rotary motion during its extension operation. As shown rather schematically in these figures, this form of flap motion is accomplished through the use of flap tracks 47, which are secured to wing member portion 12, and flap rollers 48, which are part of an assembly or assemblies secured to flap component 14; movement is caused by flap actuator 27.

Because various actuating system linkages, mechanism connections, and the like are incorporated in certain zones of the leading edge portion of flap component 14 as shown in Fig. 9, it may become desirable to install distribution duct 40 in flap component 14 in several sections; an arrangement of this type is clearly shown in Fig. 9. Such being the case, it becomes necessary to provide end caps 46 as shown in Figs. 8 and 9. Supply of high-energy air is made to each distribution duct section through a manifolding arrangement cooperating with supply duct 21; this arrangement too, is shown in Fig. 9. Although not shown, it is deemed advisable that a make-and-break joint be used to interconnect that portion of duct 21 located interior of flap 14 with the portions of that duct located within fuselage 11, when the flap is in its extended position.

We prefer that the exit opening of discharge slot 30 be particularly located with respect to the profile of wing member flap component 14, in order that the boundary-layer control system of this invention be made optimumly effective. More specifically, the exit opening of discharge slot 30 should be located in or immediately adjacent the upper surface of flap 14 and at a point which is at, or in the vicinity of, the chordwise minimum pressure point for the flap upper surface aerodynamic pressure distribution. The precise location of this point will of course vary according to the design or particular cross-sectional configuration of the flap component.

Secondly, slot 30 should be so oriented with respect to the upper surface of flap component 14 so that air issuing from the slot will be discharged therefrom in a direction tangent to the upper surface contour at the point of discharge. It will be noted from the drawings that slot 30 is provided with some length or depth in the direction of intended discharge.

Third, the discharge of supercirculation air from slot 30 should preferably be in a direction perpendicular to the width of the slot (slot length being in the direction of air flow). In swept-wing aircraft the rearwardly directed air discharge flow will be angular to the longitudinal axis of the aircraft; generally only in straight-wing aircraft will the discharge flow be in the direction of the aircraft's airstream.

Further, it should be noted that if spacers such as those at 45 in Fig. 8 are used, they should be so oriented or positioned that they do not overturn the supercirculation air and thus turn it back in a direction having directional components opposite to those of its flow through the plenum. Hence, the angle of turn should never be greater than a right angle to minimize air energy losses.

We have also discovered that the air discharged through slot 30 should be discharged therethrough at velocities which attain the velocity of sound. Maximum system efficiency is attained through maintenance of super-critical pressures in the plenum or air distribution duct to additionally produce sonic and supersonic air velocities at points downstream of the slot exit opening. By using air having sonic or supersonic velocities downstream the slot exit opening for the purpose of strengthening the circulation field about the airfoil, an optimum condition will erist in relating $\Delta C_L$ to $C\mu_f$, where $\Delta C_L$ is the increment increase in the airfoil coefficient of lift and $C\mu_f$ is a non-dimensional parameter relating to boundary-layer control flow momentum. Both of these analytical terms are well-known in the aerodynamic sciences.

The cross-sectional configuration of the distribution duct component of our boundary-layer control system should particularly incorporate features that will minimize the air energy losses that occur during distribution of air through the system components. To minimize these losses, we prefer that the form of duct shown in Figs. 2 through 7 of the drawings be utilized in the system. It will therefore be noted that the zone of transition from the duct or plenum portion to the slot or discharge portion is rather abrupt or sudden as compared to the nozzle form of transition zone contained in the distribution duct component 40 shown in Figs. 8 through 11. However, even with this latter form of duct, the transition from the nozzle portion to slot 30 is quite abrupt and again, by using this arrangement, frictional losses caused by high velocities are greatly reduced.

If, from a construction standpoint, the use of a distribution duct of the form designated as 40 is desired, it is recommended that the length of the converging nozzle leading up to discharge slot 30 be kept as short as is reasonable. This is in keeping with the requirement that air energy losses be kept to a minimum.

Slot 30, provided in the boundary-layer control systems of this invention, is preferably continuous throughout the length or span of its associated wing member flap component 14. Particular construction situations may exist, such as that illustrated in Figs. 9 through 11, where continuity throughout the span length is impossible or where, for strength requirements, spacers or stiffening members are needed. However, to the extent possible, transverse continuity of discharge-flow is highly desirable, and it should not be unnecessarily sacrificed.

With reference to known aircraft turbo-jet engine constructions, air as typically directed from compressor 18 may vary in temperature from 350°–400° Fahrenheit, minimum to 750°–850° Fahrenheit, maximum, depending upon atmospheric conditions. Ducting pressures generally range from about 150–175 pounds per square inch absolute at the supply duct entrance to about 100–125 pounds per square inch absolute at the discharge slot entrance. The use of elevated pressures for supercirculation air distribution in relation to rather fixed flow momentum requirements appreciably reduces the size of ducting required as compared to relatively low pressure distribution systems. Also, because the locus points of discharge for the supercirculation type boundary-layer control system of this invention is located more adjacent the line of chord-wise minimum pressure points of the flap upper surface pressure distribution than is the discharge line of those supercirculation systems located in the trailing edge of the wing member, a substantial lowering of supercirculation air quantity requirements is effected.

It should be pointed out that the boundary-layer control system of this invention is selectively operable by the operator of the aircraft and it may be utilized during flight cruising and during take-off and landing operations. Through operation of electrical controls or their equivalent, valve means 25 can be made to function to cause high-energy air to be diverted from the engine compressor 18, through the components of our boundary-layer control system, and thence blown in a prescribed manner rearwardly over the upper surface of flap component 14 to thus improve the wing member's lifting effectiveness. Further, the system of this invention may be operated in the hereinbefore prescribed manner to provide a degree of roll or lateral control not otherwise obtainable with heretofore known forms of supercirculation boundary-layer control system.

As noted above, the boundary-layer control system of our invention may be advantageously utilized during aircraft flight cruising operations. An aircraft having the wing member and flap constructions shown in Figs. 5 and 6 is well-designed for this type of an operation in that the exit of slot 30 is not, during typical flight cruising operations, concealed or covered by a wing member single slot deflector or a wing member trailing edge. The construction arrangement as shown in Figs. 5 and 6 is, of course, well-suited to operation of the herein described boundary-layer control system during the aforementioned "flaps down" take-off and landing operations.

Figures 2 through 4 and 9 through 11 clearly show how the boundary-layer control system of this invention can be installed in aircraft having other forms of boundary-layer control systems. Additionally, the system of this invention may be utilized without requiring major reworking of that congested wing member trailing edge portion located just forward of the flap component leading edge. In a retrofit program this factor may be of great significance as wing flap reworking is known to be comparatively simpler.

It is here recognized that the form of boundary-layer control system herein described is well-suited for installation in or association with other aircraft flight control surfaces. For instance, the components of our system may be advantageously employed in the stabilizing surfaces of the horizontal stabilizer 15 and elevator 16 arrangement of Fig. 1. When so installed the system of this invention may be selectively operated to improve flight control of the aircraft particularly as relating to the aircraft's pitching phenomena. Additionally, such use can ultimately result in an appreciable reduction of the size or area of required horizontal stabilizer control surface.

Fuel cells are frequently located within an aircraft's wing members and often they are located in that area forward of the wing member flap components. Were the distribution duct or plenum component of a supercirculation boundary-layer control system utilizing high-temperature gases to be located in the wing member trailing edge portion, the likelihood of flash fires would be increased. However, in the system of this invention those components carrying high-temperature gases are removed from the vicinity of fuel storage facilities.

Most important, the aircraft supercirculation type of boundary-layer control system of our invention may be advantageously incorporated in high performance aircraft and utilized therein to increase wing member lifting effectiveness during low airspeed operations. The consequential reduction of minimum airspeeds needed to maintain flight control during take-off and landing operations is indicative of the fact that the boundary-layer control system of this invention may be especially advantageously installed in high-speed and other type aircraft to make such aircraft more operational with respect to typical aircraft take-off and landing facilities. As heretofore indicated, the length of runway or landing strip required, or the thrust ability required of launching equipment, or restraining effectiveness required of arresting gear, to adequately handle utilizing aircraft, is proportional to the minimum take-off or landing airspeed of that aircraft.

It is to be understood that the forms of the invention herewith shown and described are to be taken as preferred embodiments of the same, but that various changes in the shape, size and arrangement of parts may be resorted to without departing from the spirit of the invention or the scope of the subjoined claims.

We claim:

1. An airplane having wing members, having an air compressor means, and having a boundary-layer control system powered by said compressor means to provide added lift to said wing members, said wing members each having a fixed forward part and having a relatively movable flap located immediately aft of said forward part and comprised of a leading portion and a trailing portion fixedly connected to each other, and said boundary-layer control system being comprised of a substantially continuous discharge slot means located in each said flap along the upper surface of said leading portion, and of duct means connected to each said slot means and connected to said compressor means, said slot means being sufficiently restricted whereby air delivered from said compressor means to said duct means is discharged from said flap leading portions at velocities which are greater than subsonic velocities.

2. An airplane having wing members, having an air compressor means, and having a boundary-layer control system connected to said wing members and connected to said compressor means, said wing members each being comprised of a relatively fixed forward portion and a movable flap member of rigid cross-section configuration having a leading edge region located immediately aft of said fixed forward portion, and said boundary-layer control system being comprised of a substantially continuous discharge slot means of fixed height contained in each said flap member and defined by an upper interior surface and by a lower interior surface, and duct means connected to each said slot means and connected to said compressor means, said slot means being contained in said flap members at said leading edge regions and being oriented so that said upper and lower interior surfaces are parallel to adjacent upper surfaces of said flap members, whereby air delivered from said compressor means to said duct means is discharged tangent to said flap members and from said leading edge regions.

3. The airplane defined in claim 2, wherein each said wing member has a spanwise line of upper surface aerodynamic pressure distribution minimum pressure points located adjacent the juncture of said fixed forward portion and said movable flap member, said discharge slot means being located along said spanwise line throughout the spanwise length of said movable flap member.

4. A high-speed airplane having a compressor section, having opposed wing members, and having an improved boundary-layer control system, each said wing member including a fixed forward section and a pivoted flap section located immediately aft of said forward section, said flap section being comprised of a forward region and a fixedly-attached trailing region, and said boundary-layer control system being comprised of a discharge slot means in each said flap section forward region, and duct means connecting each said slot means to said compressor section, said slot means each having an exit opening of fixed height perpendicular to the flap section upper surface and being located adjacent a wing member spanwise line of aerodynamic pressure distribution minimum pressure points, said exit opening fixed height being sufficiently limited whereby air received in said slot means from said compressor section and from said duct means is discharged from said flap section forward portion with a velocity greater than subsonic velocities.

5. The airplane defined in claim 4, wherein said duct means has a distribution duct portion contained within each said flap section, said distribution duct portions being located within said flap section forward regions and having exterior surfaces which comprise exterior surface portions of said flap sections.

6. In a sonic blowing-type boundary-layer control system installed in an airplane, in combination: a wing member, a movable flap member connected to said wing member, and a substantially continuous discharge slot means having a length corresponding to the length of said flap member, said flap member being comprised of a leading edge portion and a trailing edge portion fixedly positioned relative to said leading edge portion, said discharge slot means being located in said flap member leading edge portion at its upper surface and having an exit opening of set height fixedly positioned relative to said flap member leading edge and trailing edge portions.

References Cited in the file of this patent
UNITED STATES PATENTS

| | | |
|---|---|---|
| 1,887,148 | De Ganahl | Nov. 8, 1932 |
| 2,406,923 | Stalker | Sept. 3, 1946 |
| 2,585,676 | Poisson-Quinton | Feb. 12, 1952 |

FOREIGN PATENTS

| | | |
|---|---|---|
| 955,762 | France | July 4, 1949 |